US011599974B2

(12) United States Patent
Tran et al.

(10) Patent No.: US 11,599,974 B2
(45) Date of Patent: Mar. 7, 2023

(54) JOINT ROLLING SHUTTER CORRECTION AND IMAGE DEBLURRING

(71) Applicant: NEC Laboratories America, Inc., Princeton, NJ (US)

(72) Inventors: Quoc-Huy Tran, Santa Clara, CA (US); Bingbing Zhuang, Sunnyvale, CA (US); Pan Ji, San Jose, CA (US); Manmohan Chandraker, Santa Clara, CA (US)

(73) Assignee: NEC Corporation

( * ) Notice: Subject to any disclaimer, the term of this patent is extended or adjusted under 35 U.S.C. 154(b) by 238 days.

(21) Appl. No.: 17/090,508

(22) Filed: Nov. 5, 2020

(65) Prior Publication Data

US 2021/0158490 A1    May 27, 2021

Related U.S. Application Data

(60) Provisional application No. 62/939,016, filed on Nov. 22, 2019.

(51) Int. Cl.
*G06T 5/50*     (2006.01)
*G06K 9/62*     (2022.01)
*G06N 3/04*     (2006.01)
*G06N 3/08*     (2006.01)
*G06T 5/00*     (2006.01)

(52) U.S. Cl.
CPC ............ *G06T 5/003* (2013.01); *G06K 9/6262* (2013.01); *G06N 3/04* (2013.01); *G06N 3/08* (2013.01);

(Continued)

(58) Field of Classification Search
CPC ...... G06K 9/6262; G06N 3/04; G06N 3/0454; G06N 3/08; G06T 2207/20081;
(Continued)

(56) References Cited

U.S. PATENT DOCUMENTS 8,866,927 B2 * 10/2014 Levoy ................. G06V 10/758
                                                             348/222.1
8,995,784 B2 *  3/2015 Hasinoff ................. G06T 5/003
                                                             382/199

(Continued)

OTHER PUBLICATIONS

Shuochen Su, "Exploiting Temporal Structures in Computational Photography," Apr. 2018, A Thesis Submitted in Partial Fulfillment of the Requirements for the degree, The University of British Columbia 2018, pp. 40-55.*

(Continued)

*Primary Examiner* — Omar S Ismail
(74) *Attorney, Agent, or Firm* — Joseph Kolodka (57) ABSTRACT

A method for jointly removing rolling shutter (RS) distortions and blur artifacts in a single input RS and blurred image is presented. The method includes generating a plurality of RS blurred images from a camera, synthesizing RS blurred images from a set of GS sharp images, corresponding GS sharp depth maps, and synthesized RS camera motions by employing a structure-and-motion-aware RS distortion and blur rendering module to generate training data to train a single-view joint RS correction and deblurring convolutional neural network (CNN), and predicting an RS rectified and deblurred image from the single input RS and blurred image by employing the single-view joint RS correction and deblurring CNN.

18 Claims, 7 Drawing Sheets

(52) U.S. Cl.
CPC .............. *G06T 5/002* (2013.01); *G06T 5/50* (2013.01); *G06T 2207/20081* (2013.01); *G06T 2207/20084* (2013.01); *G06T 2207/20201* (2013.01)

(58) Field of Classification Search
CPC . G06T 2207/20084; G06T 2207/20201; G06T 5/002; G06T 5/003; G06T 5/50; G06V 10/764; G06V 10/82
See application file for complete search history.

(56) References Cited

U.S. PATENT DOCUMENTS

| | | | |
|---|---|---|---|
| 9,100,514 B2* | 8/2015 | Gu | H04N 7/00 |
| 2016/0112639 A1* | 4/2016 | Rasmusson | G06T 7/215 |
| | | | 348/208.6 |
| 2016/0171666 A1* | 6/2016 | McCloskey | G06T 5/003 |
| | | | 382/255 |
| 2017/0352136 A1* | 12/2017 | Uliyar | H04N 5/247 |
| 2018/0075581 A1* | 3/2018 | Shi | G06N 3/084 |
| 2018/0293712 A1 | 10/2018 | Pixar | |
| 2019/0385283 A1* | 12/2019 | McCloskey | G06V 20/00 |
| 2020/0366846 A1* | 11/2020 | Saitsu | G06T 5/003 |

OTHER PUBLICATIONS

Maxime Meilland,"A Unified Rolling Shutter and Motion Blur Model for 3D Visual Registration," Dec. 2013, Proceedings of the IEEE International Conference on Computer Vision (ICCV), 2013, pp. 2016-2022.*

Vijay Rengarajan , "Unrolling the Shutter: CNN to Correct Motion Distortions," Jul. 2017,Proceedings of the IEEE Conference on Computer Vision and Pattern Recognition (CVPR), 2017, pp. 2291-2295.*

Bingbing Zhuang,"Learning Structure-And-Motion-Aware Rolling Shutter Correction," Jun. 2019, Proceedings of the IEEE/CVF Conference on Computer Vision and Pattern Recognition (CVPR), 2019,pp. 4551-4557.*

Vijay Rengarajan et al., "Unrolling the Shutter: CNN to Correct Motion Distortions", 2017 IEEE Conference on Computer Vision and Pattern Recognition (CVPR), Honolulu, HI, pp. 2345-2353, Nov. 9, 2017 (pp. 2346-2349; and figures 2,5).

Kupyn et al., "DeblurGAN: Blind Motion Deblurring Using Conditional Adversarial Networks", Proceedings of the IEEE Conference on Computer Vision and Pattern Recognition Jun. 18-22, 2018. pp. 8183-8192.

Meilland et al. "A Unified Rolling Shutter and Motion Blur Model for 3D Visual Registration", Proceedings of the IEEE International Conference on Computer Vision Dec. 1-8, 2013. pp. 2016-2023.

Su et al., "Rolling Shutter Motion Deblurring", Proceedings of the IEEE Conference on Computer Vision and Pattern Recognition. Jun. 7-12, 2015. pp. 1529-1537.

Zhuang et al., "Learning Structure-And-Motion-Aware Rolling Shutter Correction", Proceedings of the IEEE Conference on Computer Vision and Pattern Recognition Jun. 16-20, 2019. pp. 4551-4560.

* cited by examiner

JOINT ROLLING SHUTTER CORRECTION AND IMAGE DEBLURRING

RELATED APPLICATION INFORMATION

This application claims priority to Provisional Application No. 62/939,016, filed on Nov. 22, 2019, the contents of which are incorporated herein by reference in their entirety.

BACKGROUND

Technical Field

The present invention relates to a structure-and-motion-aware rolling shutter (RS) distortion and blur rendering module for generating synthesized RS blurred images and, more importantly, to an end-to-end learning approach for simultaneously eliminating RS distortions and blur artifacts from a single input RS and blurred image.

Description of the Related Art

Complementary metal-oxide semiconductor (CMOS) sensors with their cost advantages are employed in a majority of consumer cameras such as, e.g., webcams, mobile phones, and tablets. However, one drawback with CMOS sensors is that they operate by rolling shutter (RS) mechanism, which exposes each row of the sensor array sequentially (with a constant time delay between consecutive rows) as opposed to simultaneously in a global shutter (GS) alternative. For RS cameras, the presence of camera motion during the exposure period can cause RS distortions in the captured image, which are usually coupled with blur artifacts, especially in low-light conditions such as indoor scenes.

SUMMARY

A computer-implemented method for jointly removing rolling shutter (RS) distortions and blur artifacts in a single input RS and blurred image is presented. The method includes a structure-and-motion-aware RS distortion and blur rendering module to generate synthesized RS blurred images from a set of GS sharp images, corresponding GS sharp depth maps, and synthesized RS camera motions, and a single-view joint RS correction and deblurring network to predict an RS rectified and deblurred image from a single input RS and blurred image.

A non-transitory computer-readable storage medium comprising a computer-readable program is presented for jointly removing rolling shutter (RS) distortions and blur artifacts in a single input RS and blurred image, wherein the computer-readable program when executed on a computer causes the computer to perform the steps of a structure-and-motion-aware RS distortion and blur rendering module to generate synthesized RS blurred images from a set of GS sharp images, corresponding GS sharp depth maps, and synthesized RS camera motions, and a single-view joint RS correction and deblurring network to predict an RS rectified and deblurred image from a single input RS and blurred image.

A system for jointly removing rolling shutter (RS) distortions and blur artifacts in a single input RS and blurred image is presented. The system includes a memory and one or more processors in communication with the memory configured to generate synthesized RS blurred images from a set of GS sharp images, corresponding GS sharp depth maps, and synthesized RS camera motions by employing a structure-and-motion-aware RS distortion and blur rendering module, and predict an RS rectified and deblurred image from a single input RS and blurred image by employing a single-view joint RS correction and deblurring network.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present invention introduces an end-to-end learning approach for jointly removing rolling shutter (RS) distortions and blur artifacts in a single input RS and blurred image. In addition, the present invention introduces a procedure for synthesizing realistic RS and blurred images, which can be used for training the method. Lastly, the exemplary embodiments demonstrate the applications of the present invention toward the goals of Structure from Motion (SFM) with RS blurred images, as well as Simultaneous Localization and Mapping (SLAM) with RS blurred videos.

The present invention introduces an end-to-end learning approach for simultaneously eliminating RS distortions and blur artifacts from a single input RS and blurred image. Moreover, the present invention introduces a novel RS and blurred image synthesization procedure, which generates a large number of RS and blurred images for training a convolutional neural network (CNN).

The exemplary embodiments introduce a CNN architecture, which learns to perform single-view joint RS correction and deblurring in a single forward pass. Since the tasks of single-view RS correction and deblurring are closely coupled, the exemplary CNN can extract shared features and benefit from tackling them simultaneously. To obtain a large-scale dataset of diverse and realistic RS and blurred images for training the CNN, the exemplary embodiments introduce a structure-and-motion-aware RS distortion and blur synthesization pipeline, which exploits both camera motion and depth map during rendering. In addition, the exemplary embodiments apply the proposed approach to SFM/SLAM with RS blurred images/videos.

Figure 1:
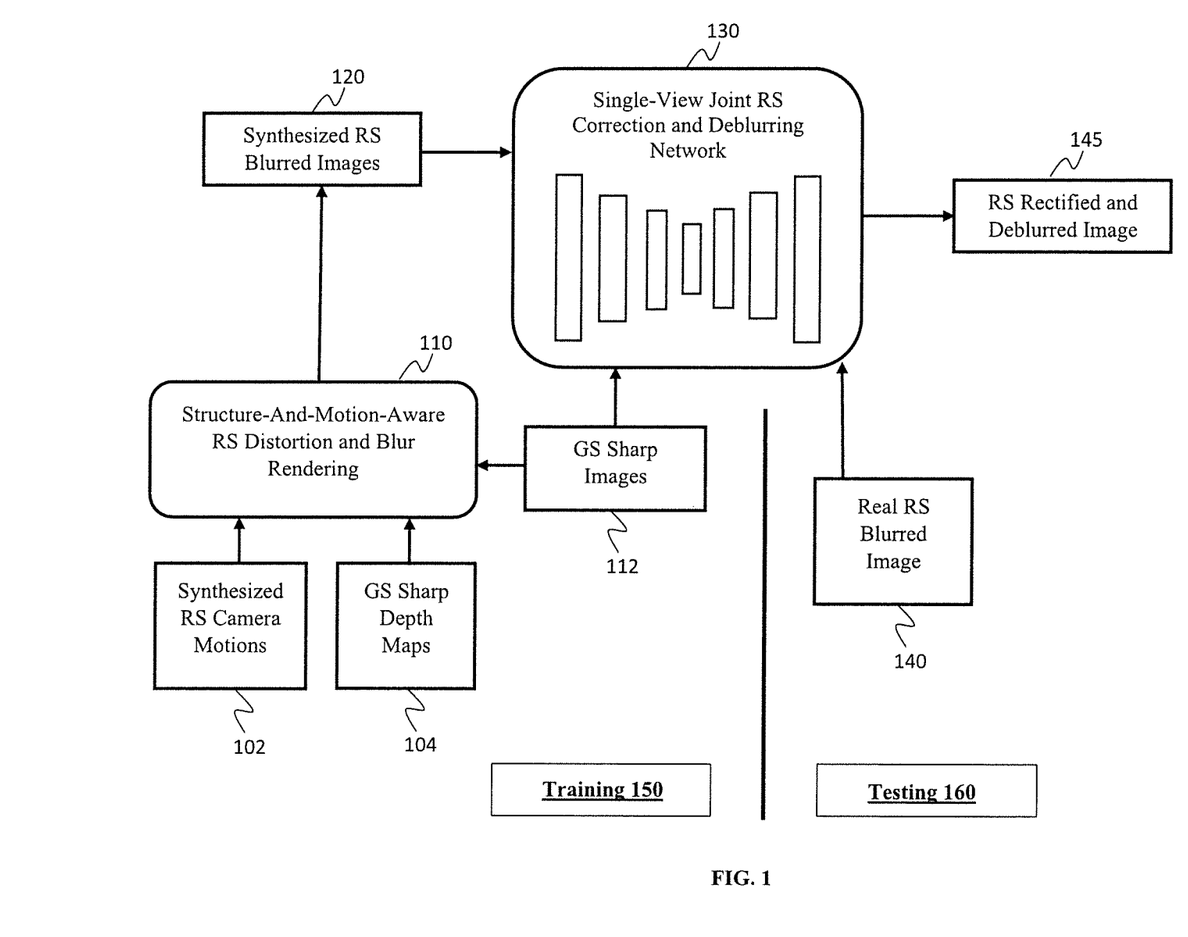
FIG. 1 is a block/flow diagram of a structure-and-motion-aware rolling shutter (RS) distortion and blur rendering module and a single-view joint RS correction and deblurring network, in accordance with embodiments of the present invention.

FIG. 1 is a block/flow diagram of a structure-and-motion-aware rolling shutter (RS) distortion and blur rendering module and a single-view joint RS correction and deblurring network, in accordance with embodiments of the present invention.

FIG. 1 presents the structure-and-motion-aware RS distortion and blur rendering module and single-view joint RS correction and deblurring network. During the training phase 150, a set of global shutter (GS) sharp images 112, corresponding GS sharp depth maps 104, and synthesized RS camera motions 102 are used by the structure-and-motion-aware RS distortion and blur rendering module 110 to generate synthesized RS blurred images 120. Specifically, the exemplary embodiments make use of depth and intra-frame camera motion to compute the 2D motion flow, which is then used to average (generating blur) and move (generating RS distortion) pixels in a local region. The synthesized RS blurred images 120 and the original GS sharp images 112 are then used as input data and ground truth supervision respectively for training the single-view joint RS correction and deblurring network 130 in an end-to-end manner. At test time 160, a single real RS blurred image 140 is input to the network 130, which produces the corresponding RS rectified and deblurred image 145 in a single forward pass.

Figure 2:
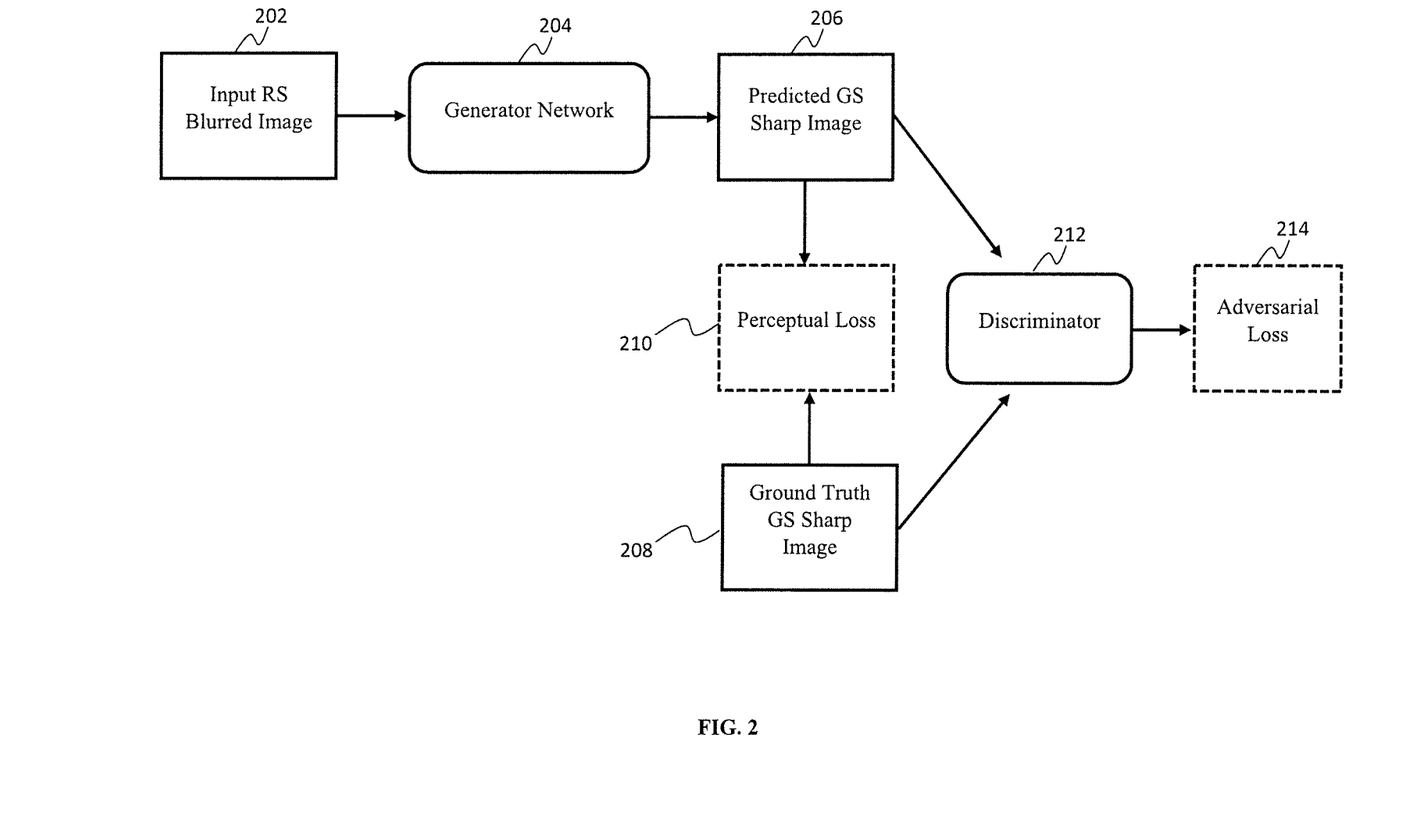
FIG. 2 is a block/flow diagram of an exemplary architecture of the single-view joint RS correction and deblurring network, in accordance with embodiments of the present invention.

FIG. 2 is a block/flow diagram of an exemplary architecture of the single-view joint RS correction and deblurring network, in accordance with embodiments of the present invention.

During the training phase 150, given an input RS blurred image 202, the generator network 204 predicts the corresponding GS sharp image 206. The discriminator network 212 takes either the predicted GS sharp image 206 or the ground truth GS sharp image 208 and aims to classify if it is "fake" (predicted image 206) or "real" (ground truth image 208). These two subnetworks are trained jointly via the adversarial loss 214. In addition, the exemplary embodiments add the perceptual loss 210, which minimizes the differences between the activations on different layers (conv1_1, conv2_1, conv3_1, conv4_1, conv5_1) of the visual geometry group (VGG) network (pretrained on, e.g., ImageNet) applied on the predicted image 206 and the ground truth image 208. At test time 160, only the generator network 204 is needed, while the discriminator network 212 is discarded. One example architecture for the generator network 204 is provided with reference to FIG. 3, while a multiscale discriminator network of pix2pixHD can be used as the discriminator network 212.

Figure 3:
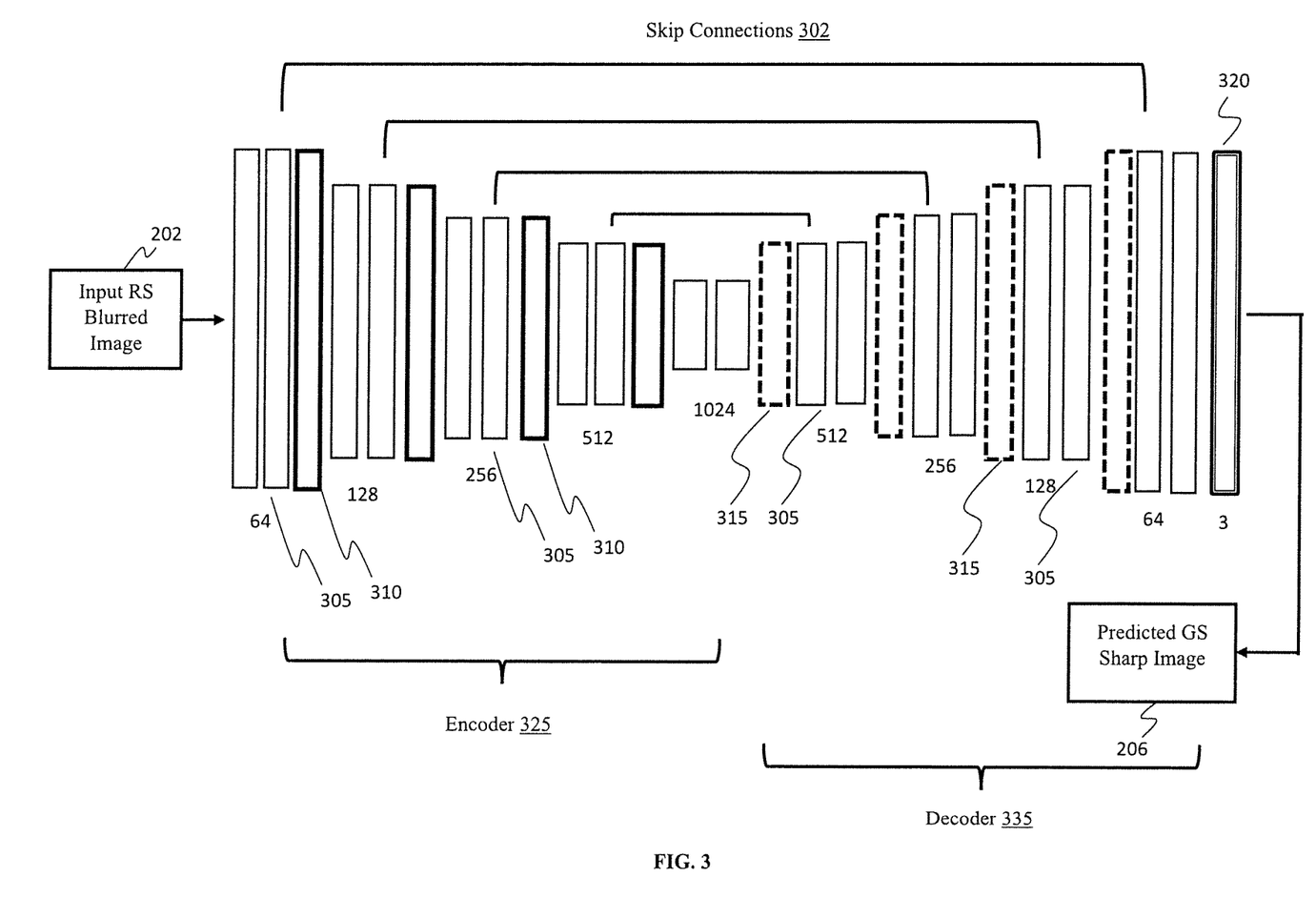
FIG. 3 is a block/flow diagram of an exemplary architecture for the generator network of FIG. 2, in accordance with embodiments of the present invention.

FIG. 3 is a block/flow diagram of an exemplary architecture for the generator network of FIG. 2, in accordance with embodiments of the present invention.

The generator network 204 includes an encoder 325, which extracts shared features between single-view RS correction and deblurring from the input RS blurred image 202 into a compact bottleneck, and a decoder 335, which upsamples the compact bottleneck to the original input image size and produces the output predicted GS sharp images 206. The exemplary embodiments add skip connections 302 between the layers in the encoder 325 and decoder 335 to allow information sharing between the encoder 325 and decoder 335. All convolutional layers 305 use a window size of 3×3, except for the last convolutional layer 320 which uses a 1×1 window size. The numbers below the boxes represent the numbers of channels. Downsampling is done by 2×2 max pooling with stride of 2. Upconvolutional layers include upsampling and 2×2 convolution that halves the numbers of feature channels. The encoder 325 and decoder 335 include convolutional layers 305, pooling layers 310, and upconvolution layers 315.

Figure 4:
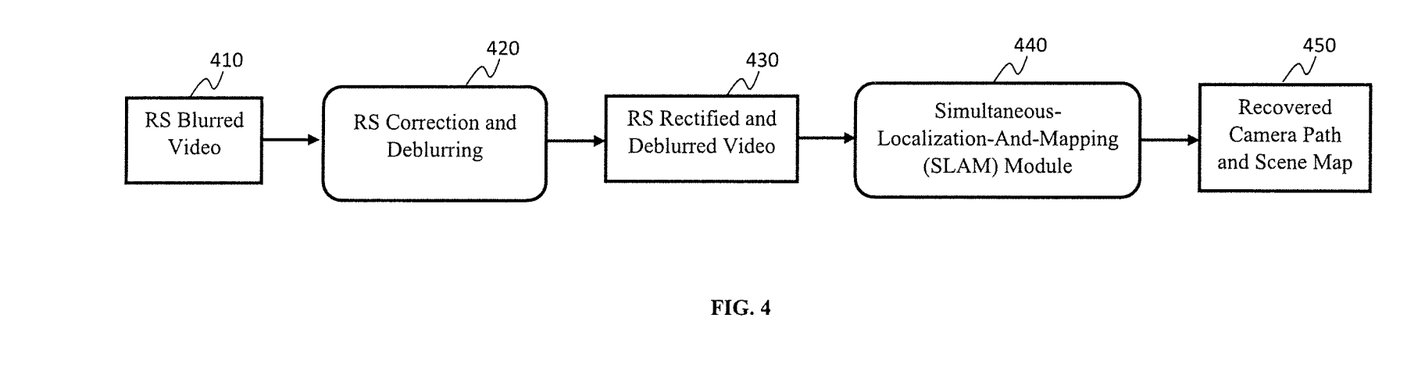
FIG. 4 is a block/flow diagram of an application of the RS correction and deblurring method to simultaneous localization and mapping (SLAM) with RS blurred videos, in accordance with embodiments of the present invention.

FIG. 4 is a block/flow diagram of an application of the RS correction and deblurring method to simultaneous localization and mapping (SLAM) with RS blurred videos, in accordance with embodiments of the present invention.

The application of the RS correction and deblurring method to SLAM with RS blurred videos is shown in FIG. 4. An input RS blurred video 410 is a set of consecutive image frames that have RS distortions and blur artifacts. Each frame is then passed respectively to the proposed RS correction and deblurring method 420 (e.g., RS correction and deblurring) for removing RS distortions and blur artifacts and obtaining the corresponding RS rectified and deblurred frame 430. The RS rectified and deblurred frames 430 are then sent to an SLAM module 440 for estimating the camera trajectory and scene structures 450 observed in the video.

Figure 5:
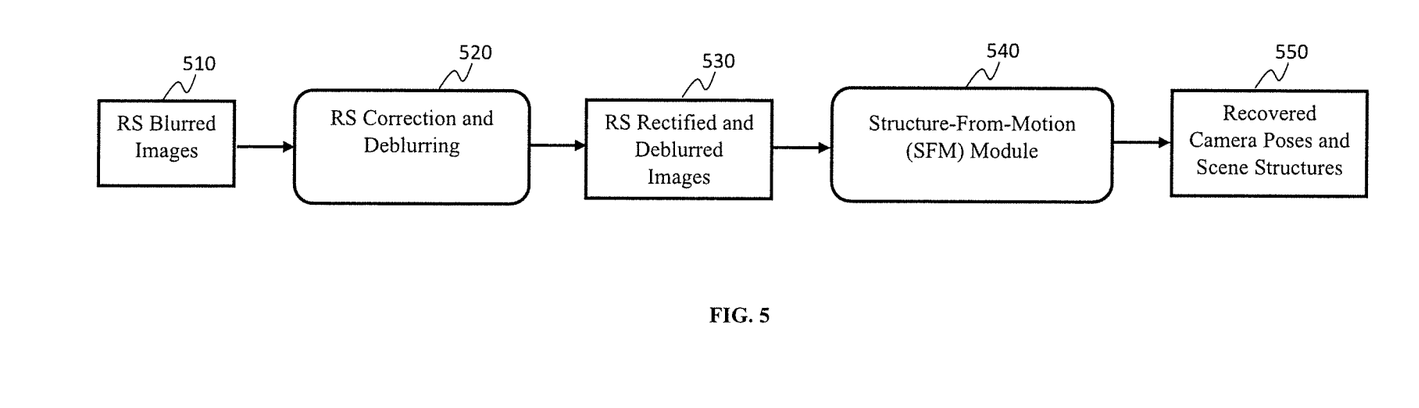
FIG. 5 is a block/flow diagram of an application of the RS correction and deblurring method to structure from motion (SFM) with RS blurred images, in accordance with embodiments of the present invention.

FIG. 5 is a block/flow diagram of an application of the RS correction and deblurring method to structure from motion (SFM) with RS blurred images, in accordance with embodiments of the present invention.

The application of the RS correction and deblurring method to SFM with RS blurred images is depicted in FIG. 5. An unordered set of RS blurred images 510 such as those obtained from, e.g., Google Image Search can be used as input for SFM with RS blurred images. Each image is then passed separately to the proposed RS correction and deblurring method 520 (e.g., RS correction and deblurring) for removing RS distortions and blur artifacts and obtaining the corresponding RS rectified and deblurred image 530. The RS rectified and deblurred images 530 are then sent to an SFM module 540 for estimating the camera poses and scene structures 550 observed in the images.

Figure 6:
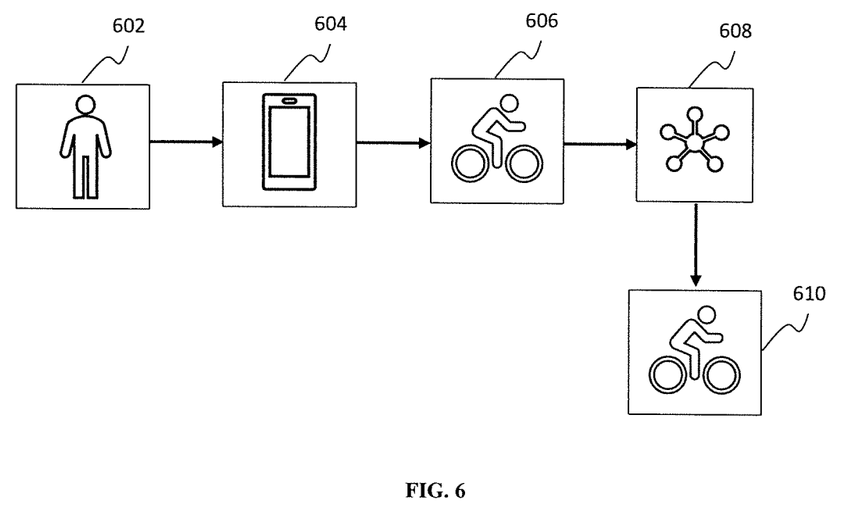
FIG. 6 is a block/flow diagram of an example practical application of the structure-and-motion-aware rolling shutter (RS) distortion and blur rendering module and single-view joint RS correction and deblurring network, in accordance with embodiments of the present invention.

FIG. 6 is a block/flow diagram of an example practical application of the structure-and-motion-aware rolling shutter (RS) distortion and blur rendering module and single-view joint RS correction and deblurring network, in accordance with embodiments of the present invention.

In one practical application, a user 602 employs a capturing device 604, such as a camera, to capture an image 606. The image 606 can be blurred and include RS distortions. The CNN architecture 608 of the present invention can be employed to estimate and remove the blur and RS effects from the captured image 606. The CNN architecture 608 then enables a sharp image 610 with no RS distortions to be output to the user 602. Here, the exemplary embodiments of the present invention introduce an end-to-end learning approach for jointly removing RS distortions and blur artifacts in a single input RS and blurred image. In addition, the present invention introduces a procedure for synthesizing realistic RS and blurred images, which can be used for training the method. Lastly, the exemplary embodiments demonstrate the applications of the present invention toward the goals of SFM with RS blurred images, as well as SLAM with RS blurred videos. The CNN architecture 608 learns to perform single-view joint RS correction and deblurring in a single forward pass. Since the tasks of single-view RS correction and deblurring are closely coupled, the CNN 608 can extract shared features and benefit from tackling them simultaneously.

Figure 7:
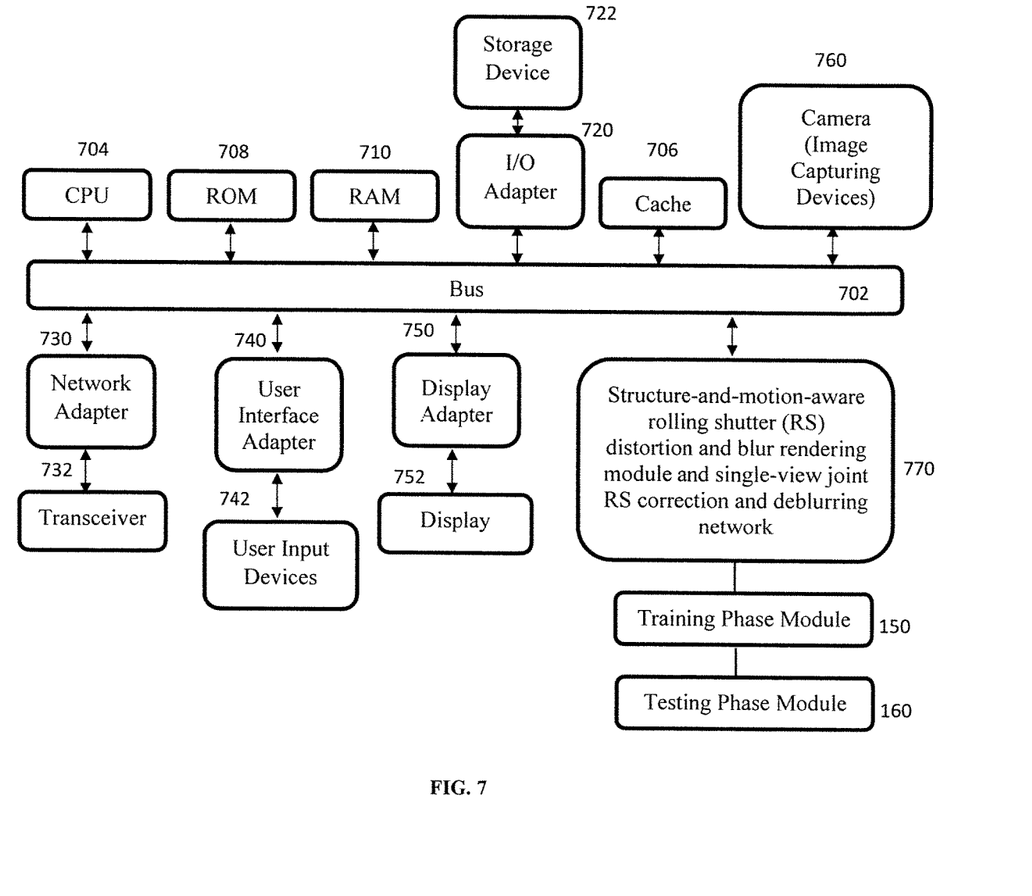
FIG. 7 is block/flow diagram of an exemplary processing system for RS correction and deblurring, in accordance with embodiments of the present invention.

FIG. 7 is block/flow diagram of an exemplary processing system for RS correction and deblurring, in accordance with embodiments of the present invention.

The processing system includes at least one processor or processor device (CPU) 704 operatively coupled to other components via a system bus 702. A cache 706, a Read Only Memory (ROM) 708, a Random Access Memory (RAM) 710, an input/output (I/O) adapter 720, a network adapter 730, a user interface adapter 740, and a display adapter 750, are operatively coupled to the system bus 702. One or more cameras 760 can be connected to bus 702. The cameras 760 can employ structure-and-motion-aware rolling shutter (RS) distortion and blur rendering module and single-view joint RS correction and deblurring network 770 for RS correction and deblurring by employing a training module 150 and a testing module 160.

A storage device 722 is operatively coupled to system bus 702 by the I/O adapter 720. The storage device 722 can be any of a disk storage device (e.g., a magnetic or optical disk storage device), a solid state magnetic device, and so forth.

A transceiver 732 is operatively coupled to system bus 702 by network adapter 730.

User input devices 742 are operatively coupled to system bus 702 by user interface adapter 740. The user input devices 742 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 742 can be the same type of user input device or different types of user input devices. The user input devices 742 are used to input and output information to and from the processing system.

A display device 752 is operatively coupled to system bus 702 by display adapter 750.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, processor devices, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 8:
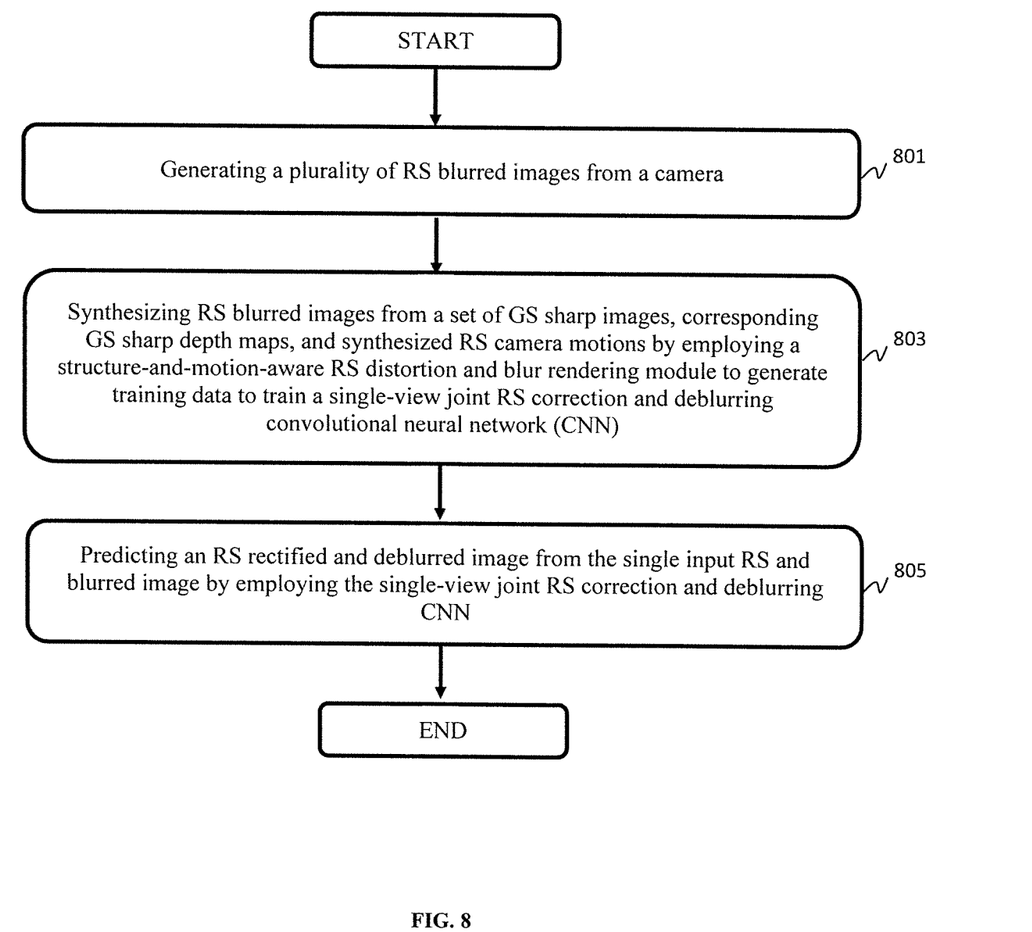
FIG. 8 is a block/flow diagram of an exemplary method for RS correction and deblurring, in accordance with embodiments of the present invention.

FIG. 8 is a block/flow diagram of an exemplary method for RS correction and deblurring, in accordance with embodiments of the present invention.

At block 801, generate a plurality of RS blurred images from a camera.

At block 803, synthesize RS blurred images from a set of GS sharp images, corresponding GS sharp depth maps, and synthesized RS camera motions by employing a structure-and-motion-aware RS distortion and blur rendering module to generate training data to train a single-view joint RS correction and deblurring convolutional neural network (CNN).

At block 805, predict an RS rectified and deblurred image from the single input RS and blurred image by employing the single-view joint RS correction and deblurring CNN.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like. Similarly, where a computing device is described herein to send data to another computing device, the data can be sent directly to the another computing device or can be sent indirectly via one or more intermediary computing devices, such as, for example, one or more servers, relays, routers, network access points, base stations, and/or the like.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "calculator," "device," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method executed on a processor for jointly removing rolling shutter (RS) distortions and blur artifacts in a single input RS and blurred image, the method comprising:

generating a plurality of RS blurred images from a camera;

synthesizing RS blurred images from a set of GS sharp images, corresponding GS sharp depth maps, and synthesized RS camera motions by employing a structure-and-motion-aware RS distortion and blur rendering module to generate training data to train a single-view joint RS correction and deblurring convolutional neural network (CNN); and predicting an RS rectified and deblurred image from the single input RS and blurred image by employing the single-view joint RS correction and deblurring CNN;

wherein single-view joint RS correction and deblurring is performed in a single forward pass.

2. The method of claim 1, further comprising, during a training phase, employing the structure-and-motion-aware RS distortion and blur rendering module with the set of GS sharp images, the corresponding GS sharp depth maps, and the synthesized RS camera motions to generate synthesized RS blurred images to train the single-view joint RS correction and deblurring convolutional neural network (CNN).

3. The method of claim 1, further comprising, during a testing phase, providing the single RS and blurred image to the single-view joint RS correction and deblurring CNN to produce corresponding RS rectified and deblurred images in a single forward pass.

4. The method of claim 2, wherein a generator network predicts corresponding GS sharp images.

5. The method of claim 2, wherein a discriminator network takes either a predicted GS sharp image or a ground truth GS sharp image to classify such image as either "real" or "fake".

6. The method of claim 5, wherein the generator network and the discriminator network are jointly trained via an adversarial loss.

7. The method of claim 6, wherein a perceptual loss is added to minimize differences between activations of different layers of a visual geometry group (VGG) network.

8. The method of claim 6, wherein the generator network includes an encoder and a decoder, the encoder extracting shared features between single-view RS correction and deblurring from the single input RS and blurred image into a compact bottleneck, and the decoder upsampling the compact bottleneck to an original input image size.

9. A non-transitory computer-readable storage medium comprising a computer-readable program for jointly removing rolling shutter (RS) distortions and blur artifacts in a single input RS and blurred image, wherein the computer-readable program when executed on a computer causes the computer to perform the steps of:
generating a plurality of RS blurred images from a camera;
synthesizing RS blurred images from a set of GS sharp images, corresponding GS sharp depth maps, and synthesized RS camera motions by employing a structure-and-motion-aware RS distortion and blur rendering module to generate training data to train a single-view joint RS correction and deblurring convolutional neural network (CNN); and
predicting an RS rectified and deblurred image from the single input RS and blurred image by employing the single-view joint RS correction and deblurring CNN;
wherein single-view joint RS correction and deblurring is performed in a single forward pass.

10. The non-transitory computer-readable storage medium of claim 9, wherein, during a training phase, a set of GS sharp images, corresponding GS sharp depth maps, and synthesized RS camera motions are employed by the structure-and-motion-aware RS distortion and blur rendering module to generate synthesized RS blurred images to train the single-view joint RS correction and deblurring convolutional neural network (CNN).

11. The non-transitory computer-readable storage medium of claim 9, wherein, during a testing phase, the single RS and blurred image is provided to the single-view joint RS correction and deblurring CNN to produce corresponding RS rectified and deblurred images in a single forward pass.

12. The non-transitory computer-readable storage medium of claim 10, wherein a generator network predicts corresponding GS sharp images.

13. The non-transitory computer-readable storage medium of claim 10, wherein a discriminator network takes either a predicted GS sharp image or a ground truth GS sharp image to classify such image as either "real" or "fake".

14. The non-transitory computer-readable storage medium of claim 13, wherein the generator network and the discriminator network are jointly trained via an adversarial loss.

15. The non-transitory computer-readable storage medium of claim 14, wherein a perceptual loss is added to minimize differences between activations of different layers of a visual geometry group (VGG) network.

16. The non-transitory computer-readable storage medium of claim 14, wherein the generator network includes an encoder and a decoder, the encoder extracting shared features between single-view RS correction and deblurring from the single input RS and blurred image into a compact bottleneck, and the decoder upsampling the compact bottleneck to an original input image size.

17. A system for jointly removing rolling shutter (RS) distortions and blur artifacts in a single input RS and blurred image, the system comprising:
a memory; and
one or more processors in communication with the memory configured to:
generate a plurality of RS blurred images from a camera;
synthesize RS blurred images from a set of OS sharp images, corresponding GS sharp depth maps, and synthesized RS camera motions by employing a structure-and-motion-aware RS distortion and blur rendering module to generate training data to train a single-view joint RS correction and deblurring convolutional neural network (CNN); and
predict an RS rectified and deblurred image from the single input RS and blurred image by employing the single-view joint RS correction and deblurring CNN;
wherein single-view joint RS correction and deblurring is performed in a single forward pass.

18. The system of claim 17,
wherein a generator network predicts corresponding GS sharp images and a discriminator network takes either a predicted GS sharp image or a ground truth GS sharp image to classify such image as either "real" or "fake,"
wherein the generator network and the discriminator network are jointly trained via an adversarial loss, and
wherein a perceptual loss is added to minimize differences between activations of different layers of a visual geometry group (VGG) network.

* * * * *